US011705261B2

(12) United States Patent
Manelis et al.

(10) Patent No.: US 11,705,261 B2
(45) Date of Patent: Jul. 18, 2023

(54) MAGNETIC FLUX CANCELLATION FOR POWER LINE COMMUNICATIONS

(71) Applicant: Solaredge Technologies Ltd., Herzeliya (IL)

(72) Inventors: Michael Manelis, Jerusalem (IL); Gil Litmanovitch, Mazkeret Batya (IL); David Braginsky, Ashdod (IL)

(73) Assignee: Solaredge Technologies Ltd., Herzeliya (IL)

( * ) Notice: Subject to any disclaimer, the term of this patent is extended or adjusted under 35 U.S.C. 154(b) by 247 days.

(21) Appl. No.: 17/036,449

(22) Filed: Sep. 29, 2020

(65) Prior Publication Data

US 2021/0098167 A1 Apr. 1, 2021

Related U.S. Application Data

(60) Provisional application No. 62/907,949, filed on Sep. 30, 2019.

(51) Int. Cl.
*H01H 47/00* (2006.01)
*H01F 7/06* (2006.01)
*H01F 27/24* (2006.01)
*H01F 27/28* (2006.01)
*H02P 9/02* (2006.01)

(52) U.S. Cl.
CPC ............ *H01F 7/064* (2013.01); *H01F 27/24* (2013.01); *H01F 27/28* (2013.01); *H02P 9/02* (2013.01)

(58) Field of Classification Search
None
See application file for complete search history.

(56) References Cited

U.S. PATENT DOCUMENTS

| 5,552,979 | A | * | 9/1996 | Gu | G01R 19/0092 |
| | | | | | 324/117 R |
| 5,578,987 | A | * | 11/1996 | XuYang | G08B 29/10 |
| | | | | | 381/59 |
| 2015/0345998 | A1 | * | 12/2015 | Lamesch | B60N 2/002 |
| | | | | | 324/686 |

FOREIGN PATENT DOCUMENTS

| FR | 2661793 A1 | 11/1991 |
| FR | 2940557 A1 | 6/2010 |

OTHER PUBLICATIONS

Mar. 1, 20211—Extended European Search Report—EP 20198889.6.

* cited by examiner

*Primary Examiner* — Stephen W Jackson
(74) *Attorney, Agent, or Firm* — Banner & Witcoff, Ltd.

(57) ABSTRACT

An apparatus comprising a signal transformer coupled to a power line and a signal transmission, reception, or detection circuit. A sensor is configured to be responsive to the power line current or magnetic flux generated in a ferrite core of the signal transformer. When the sensor indicates that the flux generated by the power line current mat cause an attenuation of the signal strength, a second circuit generates a current through a flux cancelling winding that cancels at least some of the flux generated by the power line current.

20 Claims, 9 Drawing Sheets

MAGNETIC FLUX CANCELLATION FOR POWER LINE COMMUNICATIONS

CROSS-REFERENCE TO RELATED APPLICATIONS

This application claims priority to U.S. Provisional Patent Application No. 62/907,949, filed Sep. 30, 2019. The entire disclosure of the foregoing application is incorporated by reference in its entirety.

BACKGROUND

The present disclosure relates to electronic components and devices containing electronic components.

Power line communications techniques may apply a power line communication carrier signal (such as, a communication signal) at a certain signal frequency to a direct current or alternating current power conductors (power line), such as a modulation between 1 kilo-hertz (KHz) to 100 mega-hertz (MHz). The communication signal may be encoded to transmit digital data between power devices on the same power line. A signal transformer may be used to apply the modulation to the power lines. The signal transformer may comprise a ferrite core and conductor windings. When a voltage and/or current are applied to one conductor's windings, a magnetic flux is induced in the ferrite core, and the magnetic flux induces a different voltage/current on the power line conductor's windings.

Signal transformers may be used for detecting electrical circuit issues, such as electrical noise from failing components, contact arcs, or use transmission line techniques for detecting impedance variations along the circuit path. In detecting circuit issues with a signal transformer, a communication signal may be transmitted or received along a power line. A malfunction signal (such as, an arc signal) and/or a defect signal may be generated by malfunction of the circuit. The malfunction signal and/or a defect signal may be transmitted or received along the power line. The power line in some cases may have significant DC or AC current flowing that may require a large signal transformer so that the saturation current of the ferrite core is larger than the maximum rated current of the power line winding of the signal transformer (or the power line rated current). The saturation current of the ferrite core may be high enough to prevent the power line current from saturating the core as well as for transmission and/or reception of a signal (such as the communication signal, the malfunction signal, the defect signal, etc.).

SUMMARY

The following summary is a short summary of some of the inventive concepts for illustrative purposes only and is not an extensive overview, and is not intended to identify key or critical elements, or to limit or constrain the inventions and examples in the detailed description. One skilled in the art will recognize other novel combinations and features from the detailed description.

A flux cancellation apparatus may include a ferrite core, a power line winding around the ferrite core, a signal winding for receiving or transmitting a signal (such as a communication signal, a malfunction signal, a defect signal, etc.) on the power line, and a flux cancelling winding to prevent the power line from magnetically saturating the ferrite core. A flux cancelling circuit may monitor sensor values; and, based on the sensor values, adjust the current through the flux cancelling winding so that the signal winding may have sufficient available magnetic domains in the ferrite core to send or receive the signal over the power line.

For example, the sensor may be a current sensor configured to measure the current on the power line, and limit, using the flux cancelling windings and circuit, the resulting magnetic flux from the power line current to a fixed limit of the total saturation current of the ferrite core. For example, the sensor may be a signal power sensor, and the flux cancelling circuit may monitor the sensor values to ensure that the signal strength (such as the strength of a communication signal or a malfunction signal or a defect signal) is equal to a reference value. When the signal strength is below the reference value, the current through the flux cancelling windings may be increased; and when the signal strength is above the reference value, the current through the flux cancelling windings may be decreased.

For example, a power line communication technique may use a calibration of the magnetic flux in the current transformer to perform cancellation of the magnetic flux produced by the direct current or alternating current through the power lines. The calibration may be performed during setup or startup of the power device by measuring the magnetic signal flux (generated in a ferrite core) resulting from a power line communication carrier signal when no power is being transferred through the power lines. During operation of the power device, when the power line current is flowing through the transformer, a reverse magnetic flux is applied through separate windings of the signal transformer so that the signal strength may be maintained at the same level as when no current was flowing through the power line. An analog and/or digital circuit may be used to monitor the signal power, and, based on the signal power, to drive an appropriate current through the flux cancelling windings.

As noted above, this Summary is merely a summary of some of the aspects and features described herein. It is not exhaustive, and it is not to be a limitation on the claims.

BRIEF DESCRIPTION OF THE DRAWINGS

These and other features, aspects, and advantages of the present disclosure will become better understood with regard to the following description, claims, and drawings. The present disclosure is illustrated by way of example, and not limited by, the accompanying figures. In the drawings, like numerals reference similar elements.

DETAILED DESCRIPTION

Figure 1A:
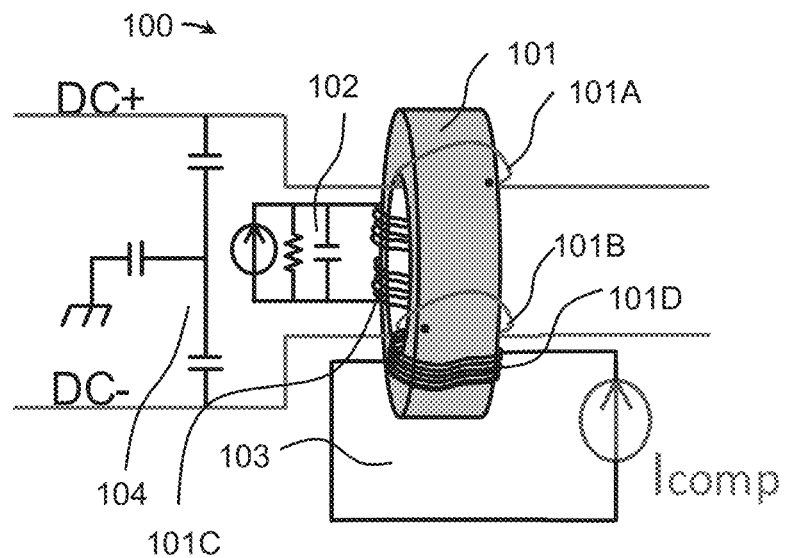
FIG. 1A shows, schematically, an example diagram of a circuit for flux cancellation on a single transformer.

The accompanying drawings, which form a part hereof, show examples of the disclosure. It is to be understood that the examples shown in the drawings and/or discussed herein are non-exclusive and that there are other examples of how the disclosure may be practiced.

Disclosed herein are flux cancelling apparatuses, devices, systems, and methods. A sensor reading may be used to drive a flux cancelling circuit for cancelling a flux from a power line in ferrite cores of signal transformers, chokes, inductors, or the like. The sensor may be configured to measure a voltage, current, signal strength, and/or the like, and, based on the measurement, a current may be driven through windings around the ferrite core in a reverse orientation that is opposite to the orientation of the power line windings. The term reverse orientation means the orientation of windings that result in a magnetic field generated in the opposite direction through the magnetic core when a positive current is applied to these windings. The power line current may be a direct current (DC) or an alternative current (AC), as long as there is a significant difference between the power line current frequency and the communication signal frequency of a communication signal, a detection signal, and/or the like. For example, a communication signal may have a frequency of 60 kilo-hertz (KHz) and the power line may have a DC current. For example, an arc detection circuit may receive signals at 104 KHZ and the power line operates at 50 Hz AC. For example, a communication signal may have a frequency of 80 KHz for transmission and 100 KHz for reception and the power line may have a DC current. A communication signal may have a frequency of between 1 KHz and 800 KHz. A communication signal may have a frequency of between 10 KHz and 400 KHz. A communication signal may have a frequency of between 40 KHz and 400 KHz. A communication signal may have a frequency of between 40 KHz and 200 KHz. A communication signal may have a frequency of between 50 KHz and 150 KHz.

Reference is now made to FIG. 1A, which shows, schematically, an example diagram of a circuit 100 for flux cancellation on a single transformer (such as, a transformer having a ferrite core 101). A power circuit 104 may comprise components and DC power lines (DC+ and DC−). DC power lines may comprise a DC current or a low frequency AC current. As used herein, the term "low frequency" means a frequency below 1 KHz. This is considered a low frequency in this example as the communication signal may be substantially higher than 1 KHz, such as a signal frequency between 10 KHz and 100 mega-hertz (MHz). It should be understood that the limit of a low frequency used in power lines may be a DC power line, a 50 Hz AC power line, a 60 Hz AC power line, and/or the like. The DC power lines may connect to at least one winding as at 101A and 101B around the ferrite core 101 of the signal transformer. A signal transmit or receive circuit 102 may be connected to a winding 101C around the core 101, where winding 101C and circuit 102 may be configured for transmitting or receiving a signal at a frequency range equal to or above 1 KHz. A flux cancelling circuit 103 may be connected to a flux cancellation winding 101D, and a current Icomp generated by circuit 103 flows through winding 101D to cancel the flux generated by windings 101A and 101B. Circuit 103 may comprise a sensor that directly or indirectly measures the flux generated from the current flowing through the power lines. The sensor may be a current sensor, a pulse width modulation (PWM) sensor, a signal power/strength/amplitude sensor, a magnetic field sensor, and/or the like. The sensor measurement related to the low frequency (or DC) flux may be used to determine when the communication signal that is being received or transmitted is nearing the saturation current limit of ferrite core 101. For example, when the DC sensor measurement is above a threshold a positive current may be applied to the flux cancelling windings. For example, when the DC sensor measurement is below a threshold a negative current may be applied to the flux cancelling windings.

Figure 1B:
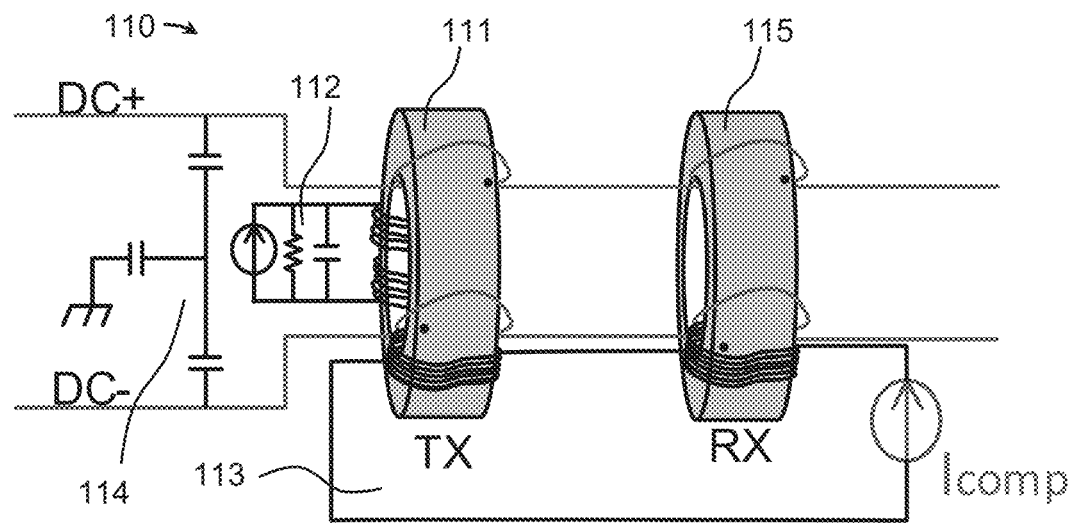
FIG. 1B shows, schematically, an example diagram of a circuit for flux cancellation on two transformers.

Reference is now made to FIG. 1B, which shows, schematically, an example diagram of a circuit 110 for flux cancellation on two transformers (such as, a TX transformer having a ferrite core 111 and an RX transformer having a ferrite core 115). Similar to FIG. 1A, in FIG. 1B, a power circuit 114 may comprise components and DC power lines (DC+ and DC−). The DC power lines may connect to at least one winding around each of ferrite cores 111 and 115 of the signal transformers, such as the transformer having ferrite core 111 for transmission (TX) and the transformer having the ferrite core 115 for reception (RX). A signal transmit and/or receive circuit 112 may be connected to one of the two transformers. A flux cancelling circuit 113 may be connected to flux cancellation windings of each of the TX and RX transformers, and a current Icomp generated by circuit 113 flows through the flux cancellation windings connected in series. Circuit 113 may comprise a sensor that directly or indirectly measures the flux generated from the current flowing through the power lines. This sensor may also be used to cancel the substantially same amount of flux in each of the two transformers. In some cases, one or more electronic components different from the sensor (responsive to the flux generated from the current flowing through the power lines) may be used to cancel the flux generated from the current flowing through the power lines. For example, a current sensor and circuit may be used to detect a current level in the power lines, and a look-up-table used to determine a flux cancelling current. The sensor measurement related to the low frequency (or DC) flux may determine when the signal that is being received or transmitted is attenuated, such as when the flux reaches the saturation current limits. Thus, Icomp may produce a flux that cancels at least some of the magnetic flux from the main power line current in each of the two transformers.

While the techniques and apparatuses in this example refer to a low frequency power line and a high frequency signal, similar techniques may be applied to frequency a high frequency power line (such as a microwave transmitter between 1 and 100 giga-hertz) and a relatively "low" frequency signal (such as a signal at 100 KHz). For example, the low pass filter in this case may be a high pass filter.

As used herein, the term "substantially" means within a tolerance (error), such as a 0.1% tolerance, a 0.2% tolerance, a 0.5% tolerance, 1% tolerance, 2% tolerance, 3% tolerance, or the like. Tolerances may usually be in the range of 0.1% to 10% tolerance. In some special cases, which may be noted specifically, the tolerances may be larger, such as up to 20%, 30%, 40%, or the like when the operation is less sensitive to the differences in values that are substantially the same. For example, a current resistor may have a resistance tolerance of 0.1%, but a cutoff voltage may have a 1% tolerance. For example, an equivalence of a reserve capacity may have a 10% tolerance, and an equivalence of air pressure may have 20% tolerance.

Sensors may be configured to measure an electrical current value of the power line, such as a root-mean-square current value, a peak current value, a DC current value, and/or the like, and adjust the flux in the ferrite core based on a closed-loop current driver configured to set the flux to a reference value. For example, the current value may be used with a look-up-table to determine the current driver output to the flux cancelling windings of the ferrite core. For example, the current sensor may be a Hall-effect current sensor and a circuit or controller is configured to monitor the sensor, apply a low-pass filter to the monitored values, peak detect the highest values (causing the most flux in ferrite core), and modify the current driver output based on the peak values.

Sensors may be implemented as one or more windings of a signal transformer, such as a transmit signal transformer, a receive signal transformer, a combined transmit/receive signal transformer, or on both transmit and receive signal transformers. The closed loop configuration allows a flux cancelling circuit to monitor the sensor(s) and drive current to a flux cancelling winding of a ferrite core, preventing the power line current (and the additional signal current) from saturating the ferrite core of the signal transformer. This allows designing a signal transformer with a saturation limit lower than the current limit of the power winding of the signal transformer. A signal transformer using flux cancellation may have a lower cost, make the power device more compact (smaller size), make the power device of lighter weight, as well as other benefits. This may be especially important for power devices rated for large currents, such as 10 amperes (A), 20 A, 50 A, 100 A and up. In general, any ampacity power device may benefit from herein disclosed aspects but especially devices rated for 10 A and up.

The number of windings of the flux cancelling windings of the signal transformer may be large thereby allowing a flux cancelling circuit for driving lower current. For example, when a power line winding is rated for 100 A and has 1 winding around the ferrite core, a flux canceling winding may have 200 windings and a current rating of 0.5 A (with matching 0.5 A current driver in flux canceling circuit), thereby requiring a relatively small current driver in the flux canceling circuit relative to the power line rating. On the other hand, the flux canceling circuit may require high voltage protection components since the power winding flux may be sensed by the flux cancelling circuit at the same ratio. In the above example, when a lightning strike to the power line causes a 10,000 volt surge for 0.1 millisecond, this may be sensed as a 2,000,000 volt surge at the flux cancelling circuit.

Figure 2:
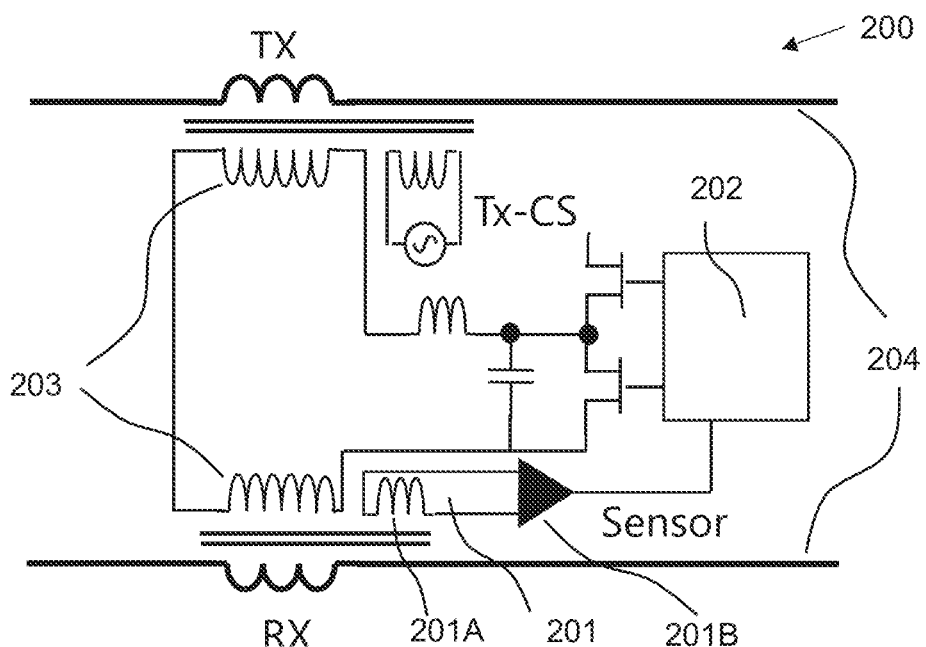
FIG. 2 shows, schematically, an example diagram of a circuit for flux cancellation.

Reference is now made to FIG. 2, which shows, schematically, an example diagram of a circuit 200 for flux cancellation. The circuit 103 as shown in FIG. 1A or the circuit 113 as shown in FIG. 1B may comprise one or more components of the circuit 200. A sensor 201 may comprise windings 201A, on a first transformer (RX), sensing a sensor signal (such as, a sensor value such as a sensor voltage value), and a circuit 201B for converting the sensor voltage value to a voltage or current to be used in determining a flux cancelling current (such as using amplifiers, filters, digital conversions, etc.). A current driving circuit 202 may be connected to sensor 201, where the circuit 202 may monitor the sensor signal sensed by the sensor 201, compute a signal strength (such as with one or more of a band-pass filter, a peak detecting filter, an averaging filter, and/or the like), and produce a corresponding PWM driver output (such as a boxcar signal with a duty cycle determined by the sensor signal) to run current though windings 203 of transformers RX and TX. This current through windings 203 may reduce the magnetic flux in the transformers resulting from power lines 204.

For example, when the current through lines 204 is high, the ferrite cores of transformers may approach saturation, especially when ferrite cores with a saturation current that is less than or equal to the rated current (such as the combined power line and signal currents). For example, when a communication circuit Tx-CS is transmitting a communication signal that requires 40% of the saturation current limit of transformer TX, and the power lines are using the 80% of the saturation current limit, the communication signal may not be transmitted with sufficient power to reach the receiving circuit along power lines 204. For example, a receiving circuit requires a 40 dB communication signal but because of the power line current, the communication signal is only 12 dB. When the sensor detects that there is only 20% available flux in the transformer, circuit 202 and windings 203 may produce a reverse flux to the power line flux, thereby reducing the combined flux to less than 30% of the saturation limit. As such, flux available for transmitting or receiving the communication signal may be increased from 20% of the saturation limit to 70% of the saturation limit (the transmitted communication signal may be at 55 dB). This reduction in combined flux is applied to both transformers TX and RX so both transmit and receive communication signals have sufficient available flux in the transformers for normal operation. When the power line current is reduced, circuit 202 may detect the change by monitoring sensor 201, and reduce the current through windings 203 appropriately using a closed loop control governed by the sensor signal.

Figure 3A:
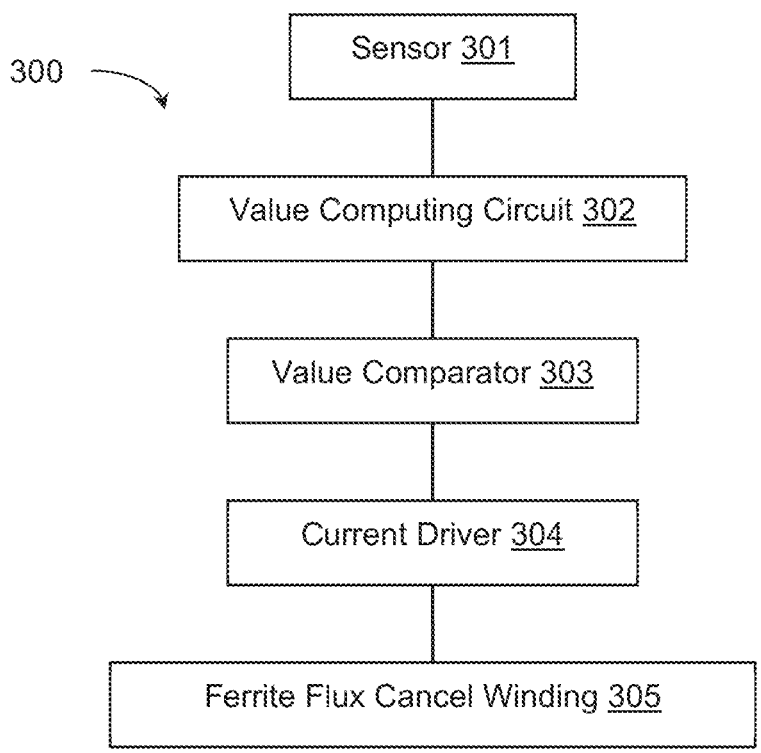
FIG. 3A shows, schematically, a block diagram of an example circuit for flux cancellation.

Reference is now made to FIG. 3A, which shows, schematically, a block diagram of an example circuit 300 for flux cancellation. A sensor 301 may detect a sensor signal (such as, a sensor value), such as a current signal, a voltage signal, a magnetic flux signal, or the like. The sensor signal may be directly related to the flux in the ferrite core due to the power line current, such as representing the DC flux in the ferrite core. The sensor signal may be inversely related to the flux in the ferrite core due to the power line current, such as representing the communication signal strength in the ferrite core. For example, the sensor signal may be inversely related to the power line flux—when the power line flux uses up a significant portion of the saturation limit, there may not be enough available ferrite magnetic domains for transmitting or receiving the communication signal at sufficient communication signal strength. A value computing circuit 302 may receive the sensor signal and produce a control loop value (such as a digital value, an analog voltage value, or the like). The control loop value may be compared (at value comparator 303) to a reference value, such as with an error amplifier, processor instructions for comparing digital values, or other means. Depending on the difference between the control loop value and the reference value, an output of a current driver 304 may be adjusted (such as, increased or decreased). The flux generated by a ferrite flux canceling winding 305 may be adjusted (such as, increased or decreased) so that the communication signal or arc detection signal may have sufficient signal flux in the ferrite core and/or signal power on the power line to be detected.

Figure 3B:
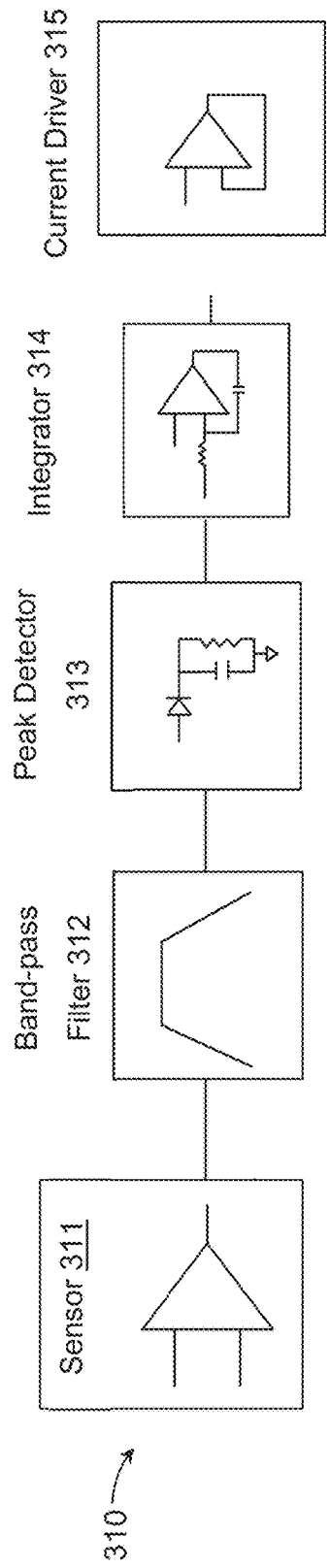
FIG. 3B shows, schematically, a block diagram of an example analog circuit for flux cancellation.

Reference is now made to FIG. 3B, which shows, schematically, a block diagram of an example analog circuit 310 for flux cancellation. Circuit 310 may include a sensor 311 for measuring a power line signal and producing a sensor signal, and a band-pass filter 312 for isolating part of the sensor signal (such as, selecting part of the sensor signal at the communication signal frequency). A peak detector 313 may determine the peak values of the communication signal during a time window, and an integrator 314 may integrate the sensor signal (such as by using an operational amplifier) to determine a PWM output signal and send it to the current driver 315. Based on the PWM output signal, the current driver 315 may generate or adjust the current applied to the ferrite flux canceling winding.

Figure 3C:
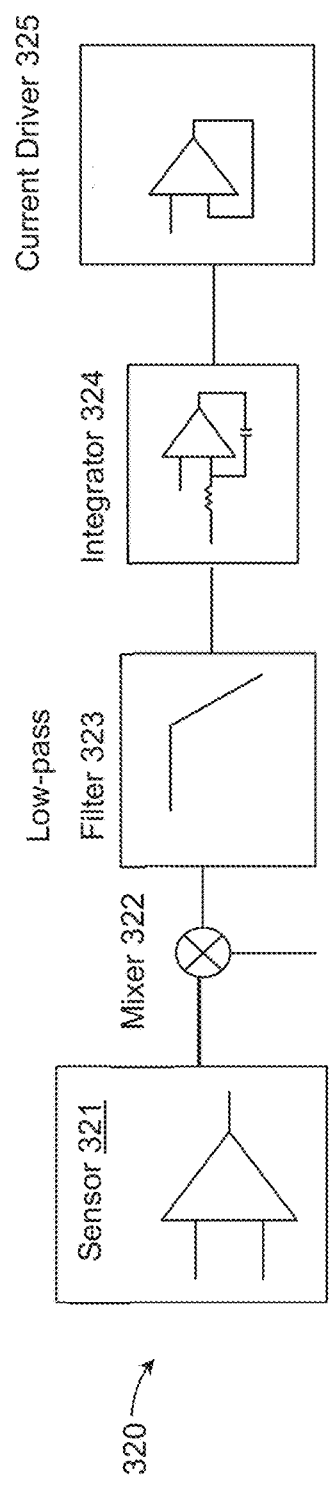
FIG. 3C shows, schematically, a block diagram of an example analog circuit for flux cancellation.

Reference is now made to FIG. 3C, which shows, schematically, a block diagram of an example analog circuit 320 for flux cancellation. Circuit 320 may include a sensor 321 for measuring a sensor signal, and a frequency mixer 322 (⊗) for isolating part of the sensor signal relative to a reference frequency. A low-pass filter 323 (such as a filter attenuating frequencies above 100 Hz, 200 Hz, 500 Hz, 1 KHz, etc.) may determine signal strength values during a time window, and an integrator 324 may integrate the signal to determine a PWM output signal and send it to the current driver 325. Based on the PWM output signal, the current driver 325 may generate or adjust the current applied to the ferrite flux canceling winding.

Figure 3D:
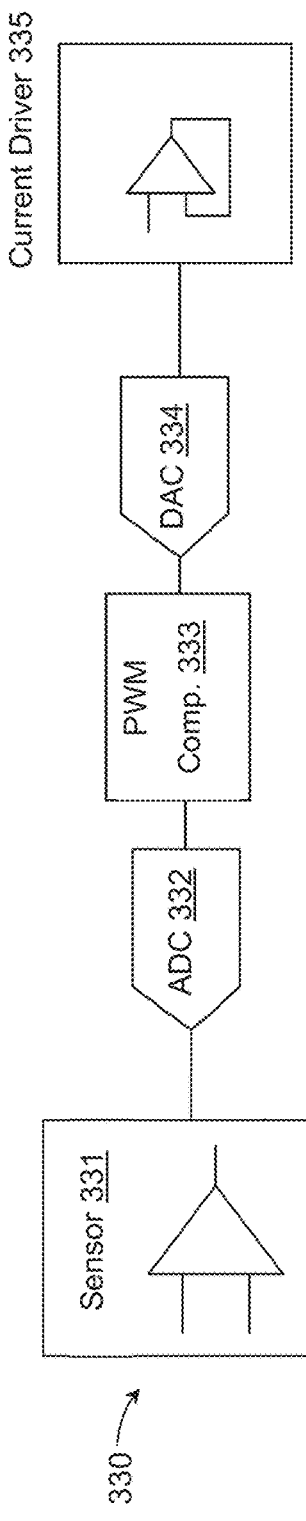
FIG. 3D shows, schematically, a block diagram of an example digital circuit for flux cancellation.

Reference is now made to FIG. 3D, which shows, schematically, a block diagram of an example digital circuit 330 for flux cancellation. Circuit 310 may include a sensor 331 for measuring an analog power line signal (producing an analog sensor signal), and an analog-to-digital converter 332 (ADC) for converting the analog sensor signal to a stream of digital sensor values. A PWM computation module 333 may determine a PWM digital output signal, and a digital-to-analog converter 334 (DAC) may generate a PWM analog output signal to send to a current driver 335. Based on the PWM output signal, the current driver 335 may generate or adjust the current applied to the ferrite flux canceling winding. As used herein, the term of the power line signal is the signal input to a sensor, and the term of the sensor signal is a signal produced on output from the sensor.

The three example circuits of FIGS. 3B, 3C, and 3D are several examples of many, and equivalent circuits may include elements of each. For example, digital PWM computation 333 may be combined with frequency mixer 322. For example, band-pass filter 312 may be combined with a mean signal detector (not shown). For example, ADC 332, digital PWM computation 333, and DAC 334 may replace integrator 314 or 324. Adding digital components to the circuit has the benefit of being able to adjust timings (such as control loop timing, peak detection timing window, or the like) during operation. For example, when the power line is a wind turbine generator output, the power line AC frequency may be variable (such as depending on wind speed) and the peak detection window may need to be modified or the control loop timing extended. For example, the power line frequency may change the noise on the power line and arc detection frequency may benefit from being modified.

Figure 4:
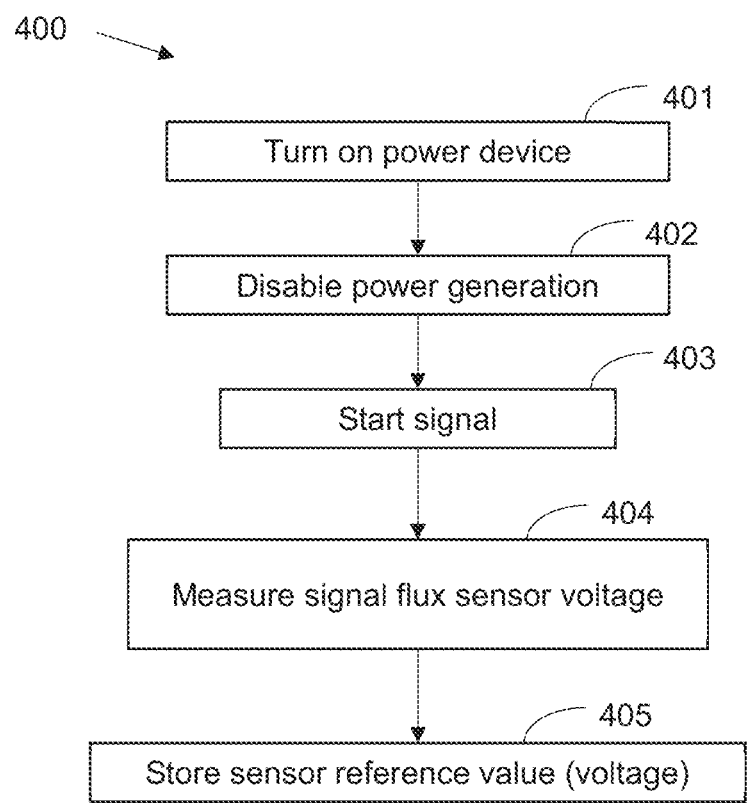
FIG. 4 shows a flowchart of a method for flux calibration.

Reference is now made to FIG. 4, which shows a flowchart 400 of a method for flux calibration. The method may include a step 401 that turns on a power device, and may optionally or alternatively include a step 402 for disabling power generation, such as when a calibration is performed during power generation. When the calibration is performed when power generation is not active, such as the power generation of a solar system at night, step 402 may be omitted. For example, a reference value (such as, a predetermined value which will be later compared to a control loop value generated by computing circuit 302) may be determined based on a signal strength of the communication signal when there is no power line current flowing in the power line. The reference value may be a voltage value, a current value, a signal strength value, an average signal value, a peak signal value, a magnetic flux value, or the like. In this example, the power line current may be disabled to measure the signal strength. A step 403 of generating or starting a signal is performed, and a step 404 of measuring the resulting sensor readings, such as measuring the sensors voltage outputs that represent signal flux are measured. The reference value may be computed as part of step 404, and the reference value may be pre-stored in a database at step 405 for use later (such as, later compared to a control loop value generated by computing circuit 302) during power line current flow to (at least in part) cancel the flux generated by the power line windings.

Figure 5A:
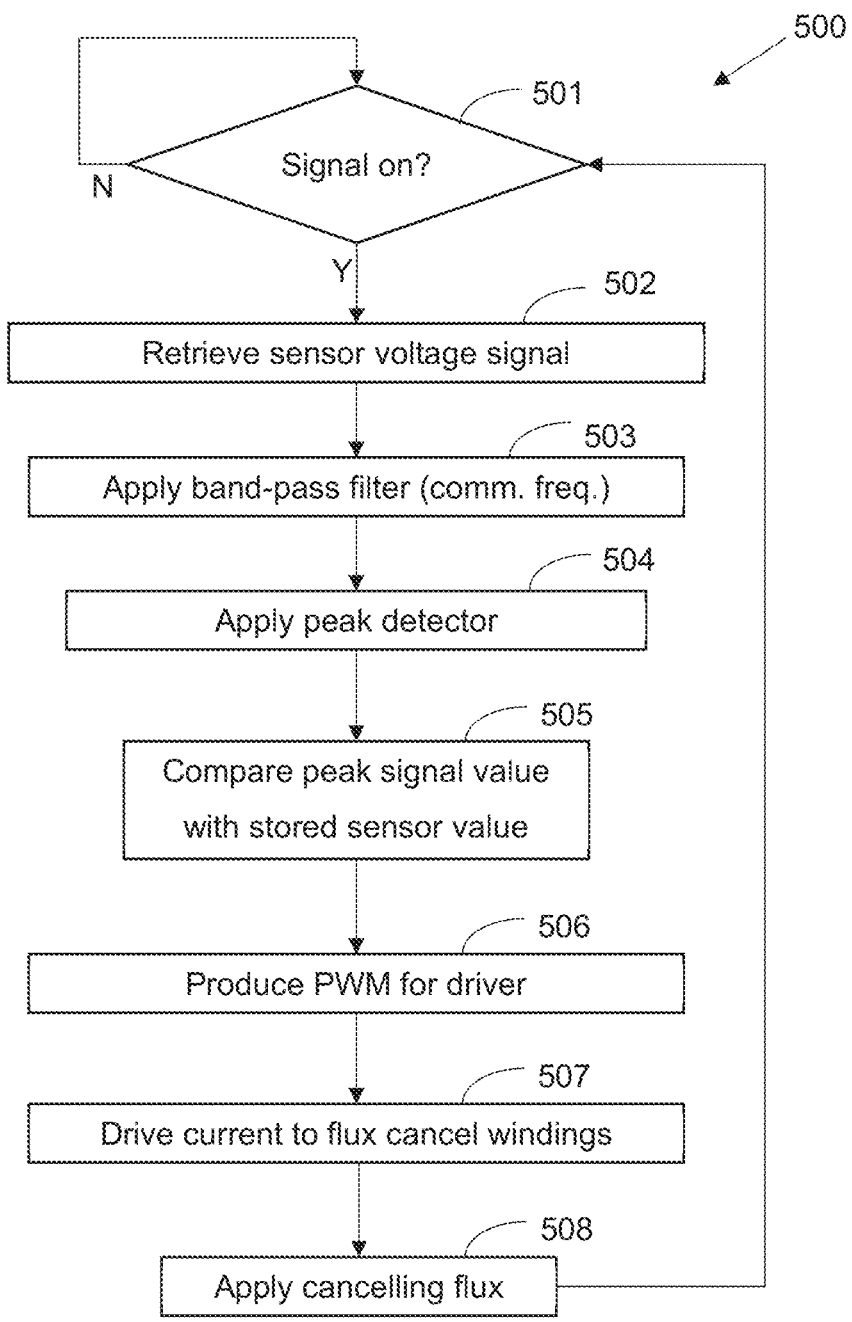
FIG. 5A shows a flowchart of a method for flux cancellation locked to band-pass signal strength.

Reference is now made to FIG. 5A, which shows a flowchart 500 of a method for flux cancellation locked to band-pass signal strength. Step 501 may detect a sensor signal (such as, a sensor voltage signal) when the communication circuit is active (such as, generating a communication signal), and step 502 may retrieve the sensor voltage signal. At step 503, the sensor voltage signal may undergo a band-pass filter centered on a communication signal frequency. A peak detector may be applied to the band-pass signal at step 504, and the resulting peak signal value of the communication signal may be compared to a pre-stored reference value (such as, a pre-stored reference peak signal value) at step 505. Based on the comparison of step 505, a PWM driver signal is produced in step 506. At step 507, the PWM driver signal is used to drive a current through flux cancellation windings, and at step 508 the cancelling flux is applied. The PWM signal is a digital signal (on or off) where the duty cycle of the PWM signal determines the amount of current through flux cancellation windings. For example, if the peak signal value is above the reference signal, the duty cycle is decreased and as a result, the flux cancelling current is decreased. Conversely, if the peak signal value is below the reference signal, the duty cycle is increased and as a result, the flux cancelling current is increased.

Figure 5B:
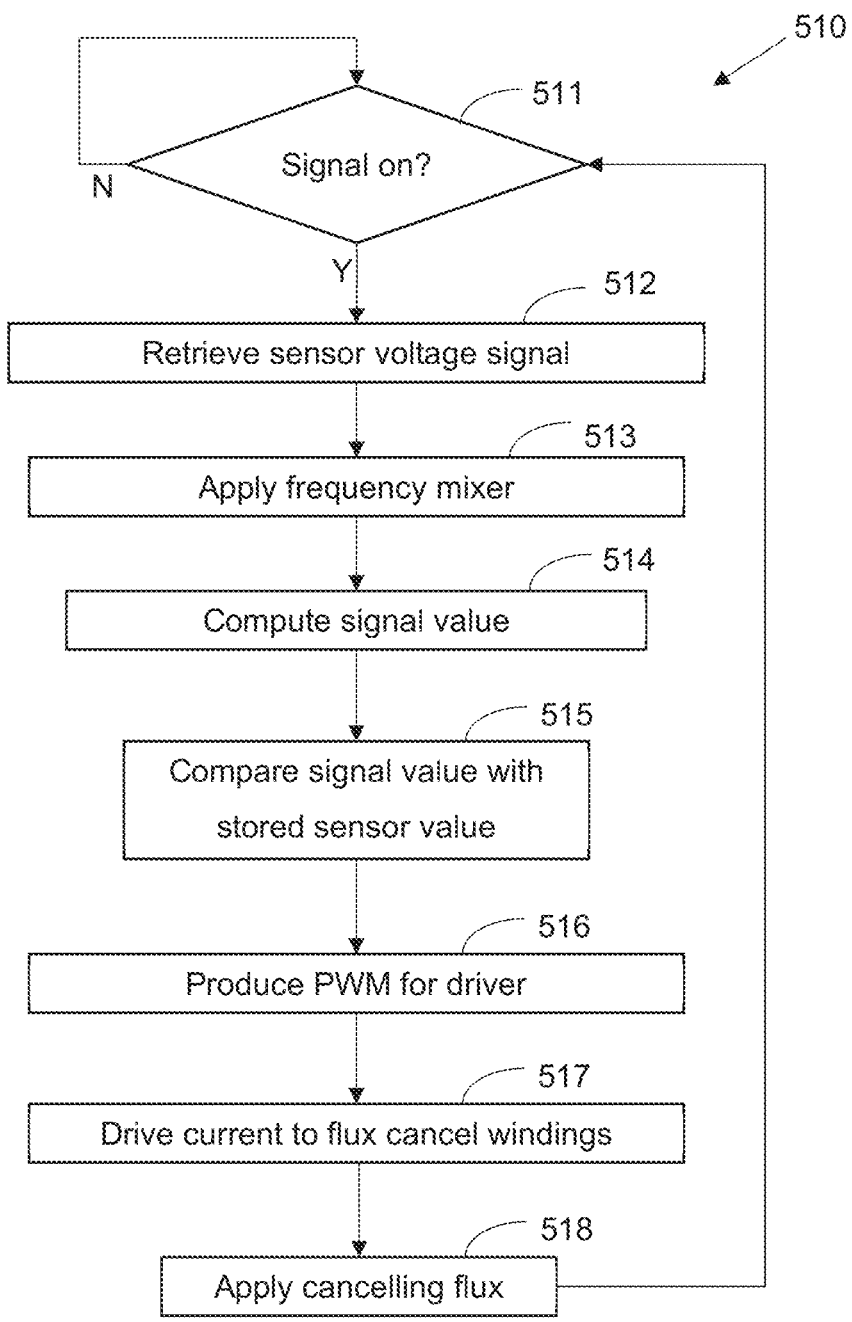
FIG. 5B shows a flowchart of a method for flux cancellation locked to mixer signal strength.

Reference is now made to FIG. 5B, which shows a flowchart 510 of a method for flux cancellation locked to mixer signal strength. Step 511 may detect a sensor signal (such as, a sensor voltage signal) when the communication circuit is active, and step 512 may retrieve a sensor voltage signal. At step 513, the sensor voltage signal may be combined with a frequency mixer (which compares the sensor voltage signal to a reference frequency signal) to produce a difference signal relative to a communication signal frequency, for example 60 KHz. A signal strength value associated with the communication signal frequency may be computed at step 514, and the resulting signal strength value is compared to a pre-stored reference value (such as, a pre-stored reference signal strength value or voltage) at step 515. Based on the comparison of step 515, a PWM driver signal is produced in step 516. At step 517, the PWM driver signal is used to drive a current through flux cancellation windings, and at step 518 the cancelling flux is applied. The PWM signal is a digital signal (on or off) where the duty cycle of the PWM signal determines the amount of current through flux cancellation windings. For example, if the peak signal value is above the reference signal, the duty cycle is decreased and as a result, the flux cancelling current is decreased. Conversely, if the peak signal value is below the reference signal, the duty cycle is increased and as a result, the flux cancelling current is increased.

Figure 5C:
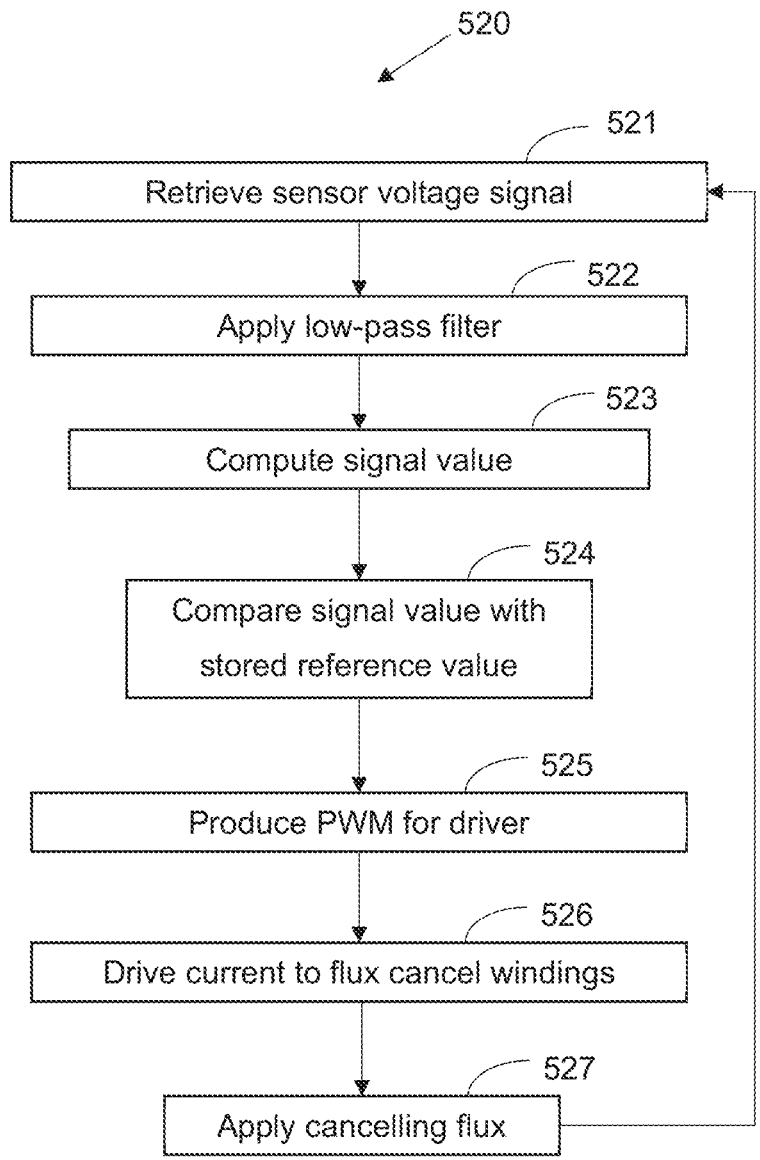
FIG. 5C shows a flowchart of a method for flux cancellation locked to low-pass signal strength.

Reference is now made to FIG. 5C, which shows a flowchart 520 of a method for flux cancellation locked to low-pass signal strength. At step 521 a sensor voltage signal is retrieved, and at step 522 a low-pass filter (such as a power line current frequency below 1 KHz) may be applied to quantify the magnetic flux from the power line current. The frequency cutoff for the low-pass filter is determined by the AC frequency of the power line. For example, if the AC frequency is 50 Hz, a low pass frequency of 100 Hz may be used. As another example, if the AC frequency is 500 Hz, a low pass frequency of 1,000 Hz may be used. A sensor signal value is computed at step 523, such as a peak value, a mean value, a median value, a 95% percentile value, and/or the like. At step 524, the sensor signal value is compared to a reference value, and at step 525 a PWM driver signal is produced based on the comparison. For example, if the sensor signal value is above the reference value, the duty cycle is increased and as a result, the flux cancelling current is increased. Conversely, if the sensor signal value is below the reference value, the duty cycle is decreased and as a result, the flux cancelling current is decreased. At step 526 the PWM driver signal is applied to a current driver, such as a half bridge driver, and the current flows throw the flux canceling windings in step 527.

The timings of the sensor signal sampling, the control loop refresh time, and the band-pass filter width are related to the application circuit of the techniques. For example, when an arc is being detected at 106 KHz, a sensor sampling rate of 1,000,000 samples per second for 0.1 millisecond may provide sufficient data for computing an arc signal strength. In this example, the bandwidth for the band-pass filter may be between 1 KHz to 10 KHz width (such as 6 KHz bandwidth and detection frequency of 103 KHz to 109 KHz) and the control loop cycle time may be between 5 KHz to 20 KHz. In another example, when the power line is a DC current or AC current with frequency of less than 500 Hz, and the communication signal frequency is 80 KHz (transmit and receive), the control loop cycle may be at an intermediate frequency, such as between 2 KHz and 10 KHz so that the control loop is faster than the average power line frequency but lower than the communication signal frequency. In general, the control loop frequency may be between the power line frequency to the signal frequency, but in practice margins are used to allow for component tolerances, such as between at least 4 times the line frequency to no more than 25% of the signal frequency. The signal bandwidth may be determined by the signal transmission or reception/detection electronic circuit, such as between 2% to 20% of the signal frequency and this may be specifically determined based on the noise of the system (so that noise does not obstruct the signal). The sampling rate for the signal may be determined by the Nyquist criterion (twice the bandwidth of a bandlimited function), but in practice this may be higher due to signal-to-noise considerations. For example, a 100 KHz signal sampled at 1 MHz may have ten samples for each signal cycle, allowing reduced noise determination of signal amplitude and phase (relative to a 200 KHz sampling rate).

Figure 6:
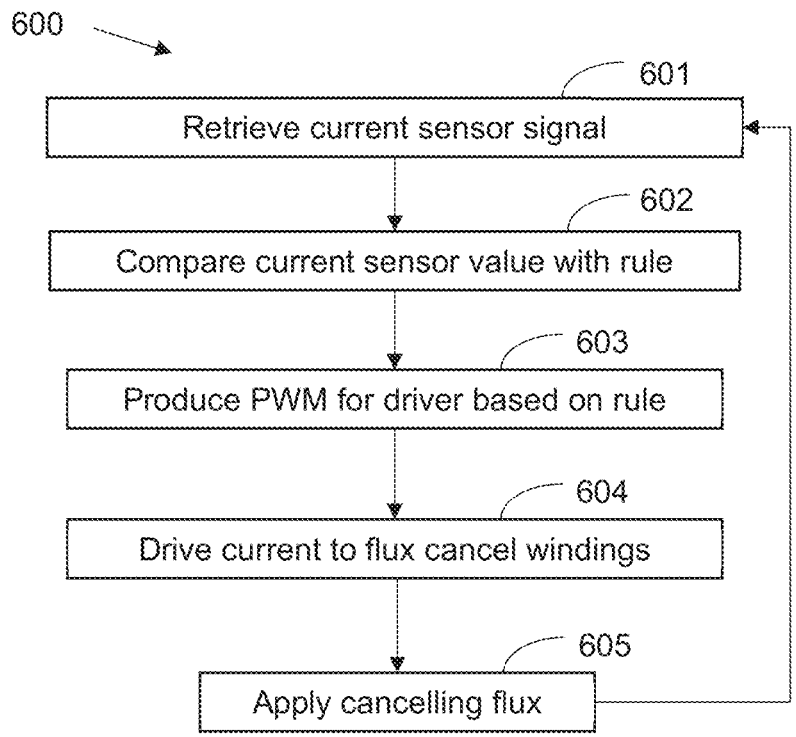
FIG. 6 shows a flowchart of a method for flux cancellation locked to current strength.

Reference is now made to FIG. 6, which shows a flowchart 600 of a method for flux cancellation locked to current strength. At step 601, a current sensor signal is retrieved for monitoring from a current sensor on the power line. The current sensor signal may a signal (such as, a current signal, a voltage signal, a magnetic flux signal, or the like) indicating the current strength of the power line current flowing in the power line. At step 602, the signal is compared with a rule, such as comparison with a reference value (such as, a reference current signal, a reference voltage signal, a reference magnetic flux signal, or the like), applying the value to a lookup table to determine the strength of the cancelling flux needed, used to compute a cancellation strength using a formula, and/or the like. At step 603 the rule output is used to produce a PWM signal for driving the current to the flux cancelling windings in step 604. The current applies the cancelling flux to the ferrite core of the transformers at step 605.

Figure 7A:
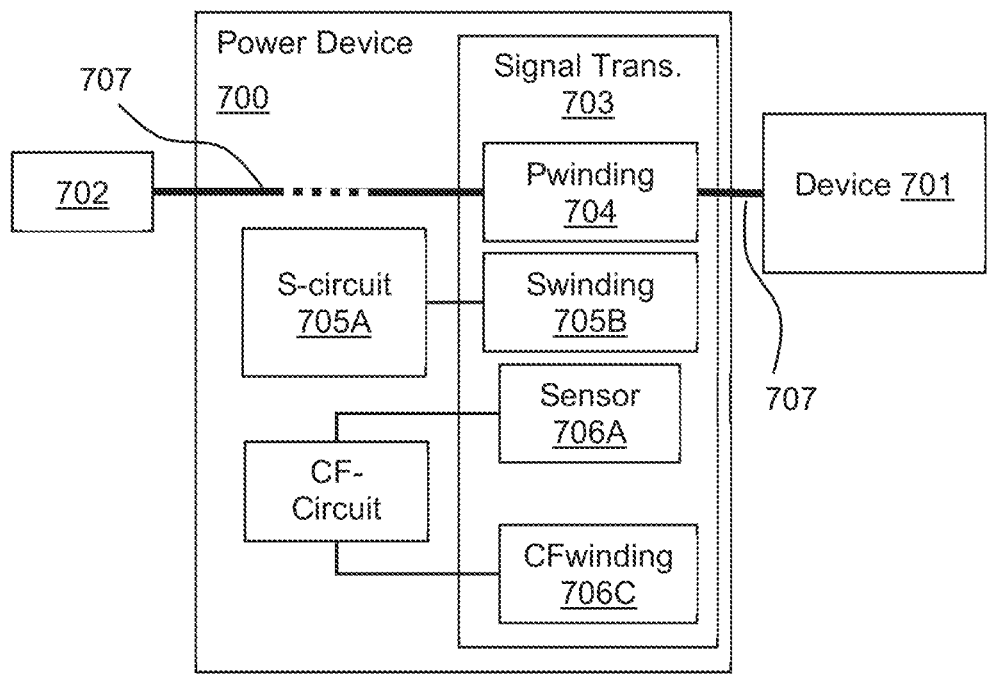
FIG. 7A shows, schematically, a power device with flux cancellation.

Reference is now made to FIG. 7A, which shows, schematically, a power device 700 with flux cancellation. Power device 700 may include inputs and outputs to other power devices 701 and 702 along power line 707. Power devices 701 and 702 may be same as or different from power device 700. A power device may be a power consumption device, a power generation device, an energy storage device, a grid connection device, one or more loads, and/or the like. Power device 700 may include a signal transformer 703 that in turn includes a ferrite core (not shown), power line winding 704 (Pwinding), a signal circuit 705A (S-circuit), and a signal winding 705B (Swinding). When the rated current of power line 707 and Pwinding 704 is close to or greater than the saturation current limit of the ferrite core, there may not be enough free magnetic domains in the ferrite core for signal transceiving when the full rated current is flowing in power line 707 (not enough headroom to the saturation limit). Transformer 703 may include a sensor 706A (such as a sensor winding to detect the signal headroom, the power line current, the power line current flux generated in the ferrite core, etc.), a flux cancelling circuit 706B (CF-circuit), and flux cancelling windings 706C (CFwinding). CF-circuit 706B may monitor sensor 706A. When the readings of the sensor 706A indicate that there is not enough headroom to the saturation limit to detect the signal using 705A and 705B, a current may be applied to the CFwinding 706B so that at least part of the flux from power line 707 is cancelled and the signal may be detected/transmitted on the power line.

Figure 7B:
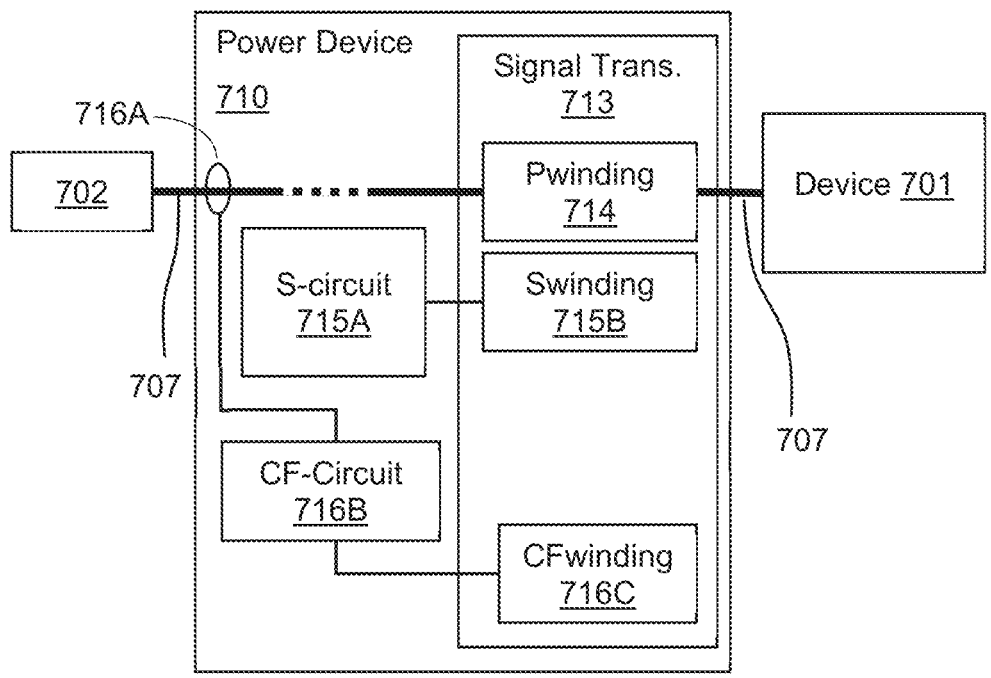
FIG. 7B shows, schematically, a power device with flux cancellation using a current sensor.

Reference is now made to FIG. 7B, which shows, schematically, a power device 710 with flux cancellation using a current sensor. Similar to FIG. 7A, in FIG. 7B, power device 710 may include inputs and outputs to other power devices 701 and 702 along the power line 707. Power device may include a signal transformer 713 that in turn includes a ferrite core (not shown), power line winding 714 (Pwinding), a signal circuit 715A (S-circuit), and a signal winding 715B (Swinding). When the rated current of power line 707 and Pwinding 714 are close to or greater than the saturation current limit of the ferrite core, there may not be enough free magnetic domains in the ferrite core for signal transceiving when the full rated current (such as, the maximum rated current) is flowing in power line 707 (not enough headroom to the saturation limit). Power device 710 may include a power line sensor 716A (such as a power line current sensor indirectly measuring the power line current flux generated in the ferrite core, etc.), a flux cancelling circuit 716B (CF-circuit), and flux cancelling windings 716C (CFwinding). CF-circuit 716B monitors sensor 716A, and when the readings of the sensor indicate that there is not enough headroom to the saturation limit (such as using a look up table or formula configured on design, startup, testing, calibration, etc.) to detect the signal using 715A and 715B, a current is applied to the CFwinding 716B. The current is applied so that at least part of the flux from the power line current is cancelled and the signal may be detected/transmitted on the power line.

Figure 7C:
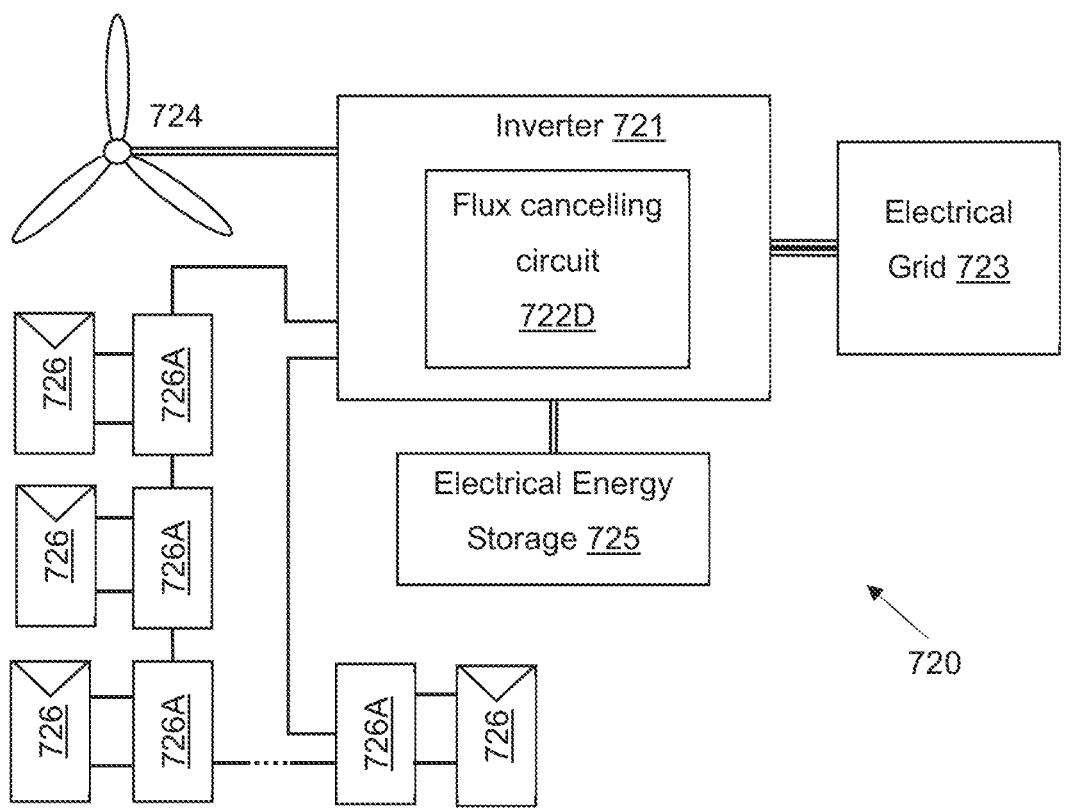
FIG. 7C shows, schematically, a power generation system with flux cancelling circuit.

Reference is now made to FIG. 7C, which shows, schematically, a power generation system 720 with flux cancelling circuit. System 720 may include power generation devices, such as wind power device 724, solar power devices 726 and 726A, etc. System 720 may include inverter 721 for receiving power from power generation devices 724, 726, and 726A, and supplying converted power to an electrical grid 723, such as a grid of loads (not shown). System 720 may include electrical energy storage 725 for storing excess power generated by 724, 726, and 726A. Inverter 721 may include a flux cancelling circuit 722D, that monitors the flux generated by one or more power lines connected to power generation devices 724, 726, and 726A, or electrical grid 723 and generates a cancelling flux in a signal transformer (not shown) thereby enabling a signal to be transmitted or received on the power line between the devices.

Any one of the methods as shown in FIGS. 4-6 may be performed by one or more of circuits, devices, and/or systems shown in FIGS. 1-3D and 7A-7C.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the disclosure. Accordingly, the foregoing description is by way of example only, and is not limiting.

Here, as elsewhere in the specification and claims, ranges may be combined to form larger ranges.

Specific dimensions, specific materials, specific ranges, specific resistivities, specific voltages, specific shapes, and/or other specific properties and values disclosed herein are example in nature and do not limit the scope of the present disclosure. The disclosure herein of particular values and particular ranges of values for given parameters are not exclusive of other values and ranges of values that may be useful in one or more of the examples disclosed herein. Moreover, it is envisioned that any two particular values for a specific parameter stated herein may define the endpoints of a range of values that may be suitable for the given parameter. For example, the disclosure of a first value and a second value for a given parameter may be interpreted as disclosing that any value between the first and second values could also be employed for the given parameter. For example, when parameter X is exemplified herein to have value A and exemplified to have value Z, it is envisioned that parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, when parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, and 3-9.

In the description of various illustrative features, reference is made to the accompanying drawings, which form a part hereof, and in which is shown, by way of illustration, various features in which aspects of the disclosure may be practiced. It is to be understood that other features may be utilized and structural and functional modifications may be made, without departing from the scope of the present disclosure.

Terms such as "multiple" as used in this disclosure indicate the property of having or involving several parts, elements, or members.

It may be noted that various connections are set forth between elements herein. These connections are described in general and, unless specified otherwise, may be direct or indirect; this specification is not intended to be limiting in this respect, and both direct and indirect connections are envisioned. Further, elements of one feature in any of the embodiments may be combined with elements from other features in any of the embodiments, in any combinations or sub-combinations.

All described features, and modifications of the described features, are usable in all aspects of the inventions taught herein. Furthermore, all of the features, and all of the modifications of the features, of all of the embodiments described herein, are combinable and interchangeable with one another.

The skilled person will appreciate that inventive aspects disclosed herein include an apparatus, method or system as in any of the following clauses:

CLAUSES

1. An apparatus comprising: a ferrite core; a first winding wrapped around the ferrite core, wherein the first winding is configured to connect to a power generation system using a power line; a second winding configured to transmit or receive a signal on the power line using the ferrite core, wherein the second winding is wrapped around the ferrite core and is connected to a first circuit; a sensor; a third winding wrapped around the ferrite core; and a second circuit connected to the third winding and the sensor, wherein the second circuit and the third winding are configured to produce a magnetic flux that cancels at least in part a magnet flux produced in the ferrite core by the first winding.

2. The apparatus of clause 1, wherein the signal comprises an electrical arc generated noise, and wherein the first circuit comprises an arc detection circuit.

3. The apparatus of clause 2, wherein the sensor comprises a current sensor, and wherein the second circuit is configured to: monitor sensor values; compute, based on the sensor values, a current value of the power line; compare the current value to a reference value; and apply the cancelling magnetic flux based on the comparison of the current value to the reference value.

4. The apparatus of clause 1, wherein the signal comprises a communication signal, and wherein the first circuit comprises a communication circuit.

5. The apparatus of clause 4, wherein the second circuit is configured to: in response to the communication circuit being active, monitor sensor values; compute, using the sensor values, a signal value of the communication signal; compare the signal value to a reference value; and apply the cancelling magnetic flux in a reverse orientation, that is opposite to an orientation of the first winding, based on the comparison of the signal value to the reference value.

6. The apparatus of any one of clauses 1 to 5, wherein the ferrite core comprises a magnetic flux saturation limit, and wherein a maximum current of the power line, when not cancelled, produces a first magnetic flux in the ferrite core greater than the magnetic flux saturation limit.

7. The apparatus of any one of clauses 1 to 6, wherein the second circuit comprises analog components.

8. The apparatus of any one of clauses 1 to 7, wherein the second circuit comprises at least one digital component.

9. The apparatus of any one of clauses 1 to 8, wherein the sensor comprises a fourth winding configured to measure the magnetic flux in the ferrite core.

10. The apparatus of any one of clauses 1 to 9, wherein the sensor comprises a current sensor configured to measure the current in the power line.

11. The apparatus of any one of clauses 1 to 10, wherein the sensor comprises a pulse width modulation (PWM) sensor configured to measure a value associated with the current in the power line.

12. The apparatus of any one of clauses 1 to 11, wherein the second circuit comprises at least one component from the group consisting of a band pass filter, a frequency mixer, a peak detector, a signal averaging component, a signal median component, a comparator, a PWM generator, and a current driver.

13. The apparatus of clause 12, wherein the at least component is at least one analog electrical component.

14. The apparatus of clause 12, wherein the at least one component is software component comprising program code configured for implementing component functions using at least one processor.

15. A power device comprising the apparatus of any one of clauses 1 to 14.

16. An inverter comprising the apparatus of any one of clauses 1 to 14.

17. A power converter comprising the apparatus of any one of clauses 1 to 14.

18. A power generation system comprising the apparatus of any one of clauses 1 to 14.

19. A method comprising: monitoring sensor values; computing, using the sensor values, a current value or a signal value of a power line; comparing the current value or the signal value to a reference value; and applying, using a winding on a ferrite core comprising windings of the power line in an opposite orientation, a cancelling magnetic flux based on the comparison of the current value or the signal value to the reference value.

20. The method of clause 19, wherein the applying the cancelling magnetic flux comprises: adjusting, based on the comparing the current value or the signal value to the reference value, a flux cancelling current applied to the winding on the ferrite core.

21. The method of clause 19, wherein the method is performed by the apparatus of any one of clauses 1 to 14.

22. A method comprising: disabling a power line current in a power line, wherein the power line current comprises a direct current or an alternative current; sending a signal, using a signal transformer, over the power line; monitoring sensor values associated with the signal; computing, using the sensor values, a signal value of the power line; and storing the signal value as a reference value for later retrieval in generating a cancelling magnetic flux in the signal transformer based on a comparison of a new signal value to the reference value.

23. The method of clause 22, wherein the signal comprises one or more of an electrical arc generated noise or a communication signal.

24. The method of clause 22, wherein the generating the cancelling magnetic flux comprises: applying a flux cancelling current to a winding on a ferrite core comprising windings of the power line.

25. The method of clause 22, wherein the alternative current has a frequency below 1,000 hertz.

26. The method of clause 22, wherein the method is performed by the apparatus of any one of clauses 1 to 14.

What is claimed is:

1. An apparatus comprising:
   a ferrite core;
   a first winding inductively coupled with the ferrite core, wherein the first winding is configured to connect to a power generation system using a power line;
   a second winding configured to transmit or receive a signal on the power line using the ferrite core, wherein the second winding is inductively coupled with the ferrite core and is connected to a first circuit;
   a third winding inductively coupled with the ferrite core;
   a sensor comprising a fourth winding configured to measure a magnetic flux produced in the ferrite core by the first winding, and
   a second circuit connected to the third winding and the sensor, wherein the second circuit and the third winding are configured to produce a cancelling magnetic flux that cancels at least in part the magnetic flux produced in the ferrite core by the first winding.

2. The apparatus of claim 1, wherein the signal comprises an electrical arc generated noise, and wherein the first circuit comprises an arc detection circuit.

3. The apparatus of claim 1, wherein the sensor comprises a current sensor, and wherein the second circuit is configured to:
   monitor sensor values;
   compute, based on the sensor values, a current value of the power line;
   compare the current value to a reference value; and
   apply the cancelling magnetic flux based on the comparison of the current value to the reference value.

4. The apparatus of claim 1, wherein the signal comprises a communication signal, and wherein the first circuit comprises a communication circuit.

5. The apparatus of claim 4, wherein the second circuit is configured to:
   in response to the communication circuit being active, monitor sensor values;
   compute, using the sensor values, a signal value of the communication signal;
   compare the signal value to a reference value; and
   apply the cancelling magnetic flux in a reverse orientation, that is opposite to an orientation of the first winding, based on the comparison of the signal value to the reference value.

6. The apparatus of claim 1, wherein the ferrite core comprises a magnetic flux saturation limit, and wherein a maximum current of the power line, when the cancelling magnetic flux is not applied, produces the magnetic flux in the ferrite core greater than the magnetic flux saturation limit.

7. The apparatus of claim 1, wherein the second circuit comprises analog components.

8. The apparatus of claim 1, wherein the second circuit comprises at least one digital component.

9. The apparatus of claim 1, further comprising a current sensor configured to measure a current in the power line.

10. The apparatus of claim 1, further comprising a pulse width modulation (PWM) sensor configured to measure a value associated with a current in the power line.

11. The apparatus of claim 1, wherein the second circuit comprises at least one component from the group consisting of a band pass filter, a frequency mixer, a peak detector, a signal averaging component, a signal median component, a comparator, a PWM generator, and a current driver.

12. The apparatus of claim 11, wherein the at least one component is at least one analog electrical component.

13. The apparatus of claim 11, wherein the at least one component is a software component comprising program code configured for implementing component functions using at least one processor.

14. A method comprising:
monitoring sensor values;
computing, using the sensor values, a current value or a signal value of a power line, wherein the current value or the signal value represents a magnetic flux in a ferrite core;
comparing the current value or the signal value to a reference value; and
applying, using a winding on the ferrite core, a cancelling magnetic flux based on the comparison of the current value or the signal value to the reference value, wherein the ferrite core is inductively coupled to the power line, and wherein the winding on the ferrite core generates the cancelling magnetic flux in an opposite orientation to the magnetic flux in the ferrite core; and
adjusting based on the comparison of the current value or the signal value to the reference value, a flux cancelling current applied to the winding on the ferrite core.

15. A method comprising:
disabling a power line current in a power line, wherein the power line current comprises a direct current or an alternating current;
sending a signal, using a signal transformer, over the power line;
monitoring sensor values associated with the signal;
computing, using the sensor values, a signal value of the power line; and
storing the signal value as a reference value for later retrieval in generating a cancelling magnetic flux in the signal transformer based on a comparison of a new signal value to the reference value.

16. The method of claim 15, wherein the signal comprises one or more of an electrical arc generated noise or a communication signal.

17. The method of claim 15, wherein the generating the cancelling magnetic flux comprises:
applying a flux cancelling current to a winding on a ferrite core, wherein the ferrite core is inductively coupled to the power line, and wherein the winding on the ferrite core generates the cancelling magnetic flux in an opposite orientation of a magnetic flux generated by the power line.

18. The method of claim 15, wherein the alternating current has a frequency below 1,000 hertz.

19. The method of claim 14, wherein the ferrite core comprises a magnetic flux saturation limit, and wherein a maximum current of the power line, when the cancelling magnetic flux is not applied, produces the magnetic flux in the ferrite core greater than the magnetic flux saturation limit.

20. The method of claim 14, wherein the current value or the signal value indicates an electrical arc generated noise or a communication signal.

\* \* \* \* \*